United States Patent
Kalaboukis et al.

(10) Patent No.: US 10,275,530 B2
(45) Date of Patent: Apr. 30, 2019

(54) SYSTEM AND METHOD FOR COMMUNAL SEARCH

(75) Inventors: Chris Kalaboukis, Los Gatos, CA (US); Elizabeth F. Churchill, San Francisco, CA (US); Athellina Athsani, San Jose, CA (US)

(73) Assignee: EXCALIBUR IP, LLC, New York, NY (US)

( * ) Notice: Subject to any disclaimer, the term of this patent is extended or adjusted under 35 U.S.C. 154(b) by 420 days.

(21) Appl. No.: 12/364,476

(22) Filed: Feb. 2, 2009

(65) Prior Publication Data

US 2010/0198869 A1 Aug. 5, 2010

(51) Int. Cl.
*G06F 17/30* (2006.01)

(52) U.S. Cl.
CPC .............. *G06F 17/30867* (2013.01)

(58) Field of Classification Search
CPC .......... G06F 17/2785; G06F 17/30522; G06F 17/30864; G06F 17/2765; G06F 17/30477; G06F 17/30979
See application file for complete search history.

(56) References Cited

U.S. PATENT DOCUMENTS

| 5,909,679 | A   | * | 6/1999  | Hall ...................... G06Q 10/10 |
| 6,510,431 | B1  | * | 1/2003  | Eichstaedt .............. H04L 29/06 |
| 7,181,438 | B1  | * | 2/2007  | Szabo |
| 8,055,675 | B2  | * | 11/2011 | Higgins et al. ............... 707/769 |
| 8,150,868 | B2  |   | 4/2012  | Richardson et al. |
| 8,380,721 | B2  | * | 2/2013  | Attaran Rezaei et al. ... 707/748 |
| 8,751,559 | B2  | * | 6/2014  | Richardson ............ G06Q 10/06 709/202 |
| 2001/0032244 | A1 | * | 10/2001 | Neustel ................. G06F 9/4446 709/206 |
| 2002/0049727 | A1 | * | 4/2002  | Rothkopf .......... G06F 17/30867 |
| 2002/0169737 | A1 | * | 11/2002 | Armstrong et al. ............ 706/59 |
| 2003/0014400 | A1 | * | 1/2003  | Siegel ............................. 707/3 |
| 2005/0055321 | A1 | * | 3/2005  | Fratkina et al. ................ 706/45 |
| 2006/0179044 | A1 | * | 8/2006  | Rosenberg ........................ 707/3 |

(Continued)

FOREIGN PATENT DOCUMENTS

| KR | 1020060135820 A | 12/2006 |
| TW | 200903281 A | 1/2009 |
| WO | 2005/089291 A2 | 9/2005 |

OTHER PUBLICATIONS

Korean Application Serial No. 1020109019, Office Action dated Jun. 13, 2011 (with English translation), 9 pages.

*Primary Examiner* — Angelica Ruiz
(74) *Attorney, Agent, or Firm* — James J. DeCarlo; Greenberg Traurig, LLP

(57) ABSTRACT

A system and method which may allow a requester to post a search query and get time-sensitive responses from other users who are best suited to respond to the search query. The system may find out such best suited responders based on their location, activity and time affinity/proximity to the search query, and forward the search query to them. The system may then return the responses to the requester. The system may also be able to automatically answer search queries based on users' historical query-response activities. By matching a search query with users knowledgeable about it, the invention may help a requester to get timely and accurate responses to his search query.

21 Claims, 5 Drawing Sheets

(56) References Cited

U.S. PATENT DOCUMENTS

| | | | |
|---|---|---|---|
| 2006/0235793 A1* | 10/2006 | Walker | G06Q 10/063112 |
| | | | 705/40 |
| 2007/0021055 A1* | 1/2007 | Arseneau et al. | 455/3.06 |
| 2007/0156677 A1* | 7/2007 | Szabo | 707/5 |
| 2007/0185843 A1* | 8/2007 | Jones | G06F 17/30864 |
| 2007/0210937 A1* | 9/2007 | Smith | G06Q 30/02 |
| | | | 340/995.1 |
| 2008/0009268 A1* | 1/2008 | Ramer | G06F 17/30867 |
| | | | 455/412.1 |
| 2008/0077529 A1* | 3/2008 | Swanburg | 705/45 |
| 2008/0177578 A1* | 7/2008 | Zakim | 705/3 |
| 2008/0282085 A1* | 11/2008 | Di Giusto | G06Q 30/00 |
| | | | 713/156 |
| 2008/0306935 A1 | 12/2008 | Richardson et al. | |
| 2009/0248671 A1* | 10/2009 | Maruyama | G06F 17/30707 |
| 2009/0265224 A1* | 10/2009 | Tarr et al. | 705/10 |
| 2009/0307205 A1* | 12/2009 | Churchill | G06F 17/30867 |
| 2010/0145976 A1* | 6/2010 | Higgins et al. | 707/765 |

* cited by examiner

Query Type: Location-Based / Time-Based / Activity-Based

Query Title:

Query Discription:

Start Time:

End Time:

Direct Query to: Friends / Expert / Public

FIG. 2A

Query Type: Location
Query Title:
Description:
Address:   Cross Streets   Street Number   Locations

FIG. 2B

Query Type: Activity
Select Category
- Sports
- Food
- Home & Garden
- Science
- Finance
- Health

FIG. 2C

SYSTEM AND METHOD FOR COMMUNAL SEARCH

BACKGROUND

Field of the Invention

The present invention relates generally to obtaining time sensitive information via the Internet.

Description of Related Art

Currently available technologies allow users to post questions on a website and receive answers from other users. One shortcoming of this approach is that a requester may not get the information he needs in time, since users who are most knowledgeable about the question may not be online or may not realize that the question has been posted, and consequently may not be able to answer the question timely. In addition, a number of users may respond to the question, but it may be difficult for the requester to find out which response is the best answer.

Therefore, it may be desirable to provide a system and method which may help a requester to get real time responses to his question from users who are best suited to answer the question.

BRIEF DESCRIPTION OF THE DRAWING FIGURES

Embodiments of the present invention are described herein with reference to the accompanying drawings, similar reference numbers being used to indicate functionally similar elements.

FIGS. 2A, 2B and 2C illustrate exemplary user interfaces for receiving communal search queries according to one embodiment of the present invention.

DETAILED DESCRIPTION

The present invention provides a system and method which may allow a requester to post a search query and get time-sensitive responses from other users who are best suited to respond to the search query. The system may find out such best suited responders based on their location, activity and/or time affinity/proximity to the search query, and forward the search query to them. Some relationship between the query recipient and the query sender also may be desirable. The system may then return the responses to the requester. The system may also be able to automatically answer search queries based on users' historical query-response activities. By matching a search query to users knowledgeable about it, the invention may help a requester to get timely and accurate responses to his search query. The invention may be carried out by computer-executable instructions, such as program modules. Advantages of the present invention will become apparent from the following detailed description.

Figure 1:
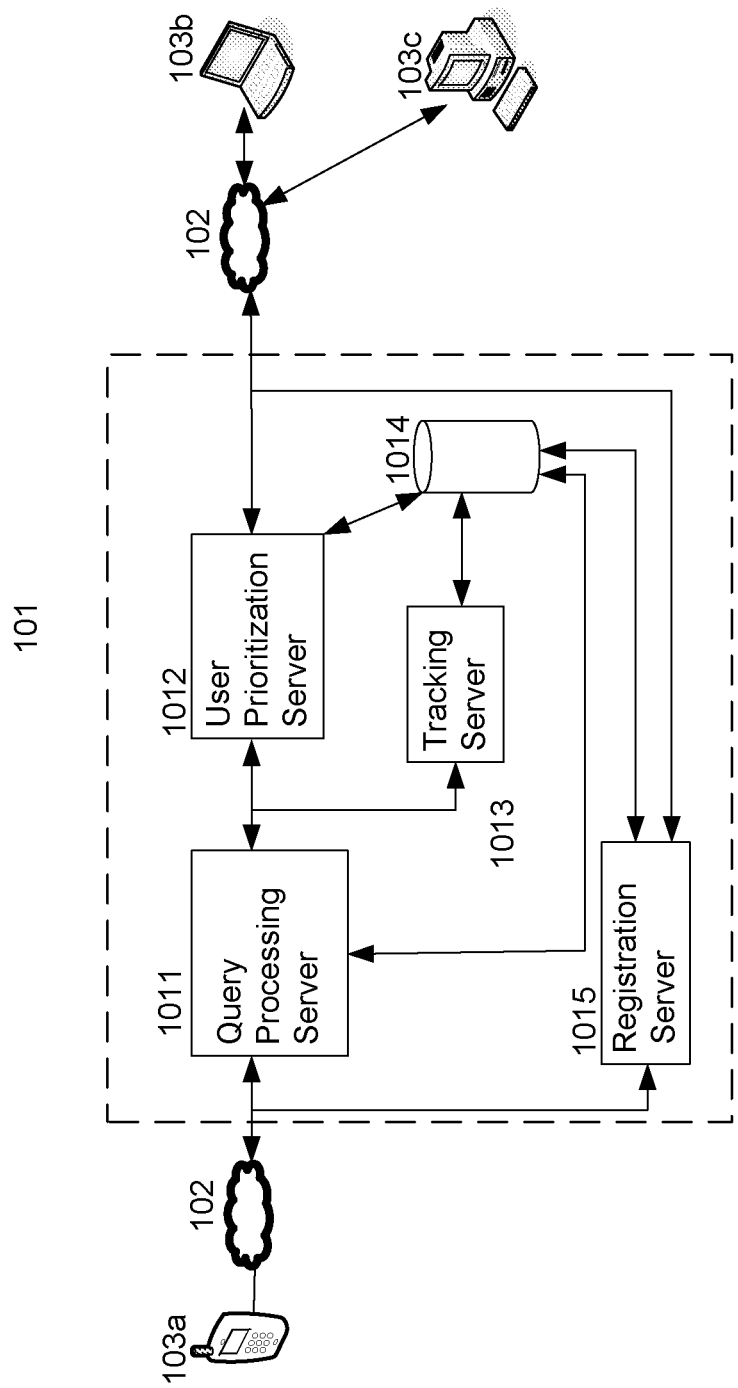
FIG. 1 illustrates a communal search system according to one embodiment of the present invention.

FIG. 1 illustrates a communal search system according to one embodiment of the present invention. Users may communicate with a communal search system 101 via a network 102 from their communication devices 103a, 103b or 103c. A communication device may be a computer, a mobile phone, a Smartphone™, a media player or any device capable of accessing the Internet. Any of these types of devices may communicate with each other over communal search system 101. In particular, via a communication device, a user may send a first search query to the communal search system 101, receive one or more responses to the first search query, receive a second search query from another user if the communal search system 101 determines that the user may be knowledgeable about the second search query, and send his answer to the second search query to the communal search system 101. A user may be a requester who sends out a query or a responder who may be able to respond to a query, and a user may be a requester for one query and a responder for another query. The network 102 may be the Internet or other telecommunication network. Network connectivity may be wired or wireless, using one or more communications protocols, as will be known to those of ordinary skill in the art.

The communal search system 101 may have a query processing server 1011, a user prioritization server 1012, a tracking server 1013 and a database 1014. The communal search system may also have a user registration server 1015. The communal search system 101 may receive a search query from a requester, select one or more users who may be knowledgeable about the search query as responders based on their current status or their profile, forward the search query to the responder(s), and return the responder's response to the requester. A user's current status may be based on time, user location and/or user activity information.

The query processing server 1011 may receive a search query from a user (or requester), who may post a search query to ask for any information he needs. In one embodiment, the communal search system 101 may provide a number of categories for search queries, e.g., location, time and activity, and the query processing server 1011 may process the search query into a query category to which the search query belongs.

FIGS. 2A, 2B and 2C illustrate exemplary user interfaces for receiving search queries according to one embodiment of the present invention. The user interface shown in FIG. 2A is a general user interface. A requester may input a query type, a query title, query description, start and end time, and/or to whom he wants the query to be directed via the user interface. If a requester is looking for information about a location, e.g., a parking place, he may choose the user interface shown in FIG. 2B, on which he may input query title, query description, and address of the location. If a requester wants to get information about an activity, e.g., a party, he may use the user interface shown in FIG. 2C, on which he may choose the type of activity he is interested in from a list first.

The tracking server 1013 may track users to obtain their relevancy information, i.e., how relevant a user is to a search query. In one embodiment, the tracking server 1013 may track users to get their current status information, which may be location and/or activity information, via their communication devices 103a, 103b or 103c. The tracking server 1013 may get the users' positioning signals either from a communication device or from a positioning system. With the positioning signals, the tracking server 1013 may infer the user's relevancy to a location, e.g., whether the user is at a restaurant, a park, a library, a hospital, etc.

The tracking server 1013 may track or infer a user's activities by monitoring his movements. When the user is moving at a certain speed or following a certain pattern, the tracking server 1013 may decide that the user is dancing. In one embodiment, the tracking server 1013 may determine the user's activities by where the user is, e.g., whether he is at a museum, a movie theater, a gym, or a stadium. In one embodiment, the tracking server 1013 may determine the user's activities by social context. For example, if the user is in a big crowd of pop-music lovers, the tracking server 1013 may determine that the user is at a pop-music concert. The tracking server 1013 may infer a user's activity information from information on the Internet, e.g., the user's on-line calendar, his statuses on instant messaging or status application such as www.twitter.com or fireeagle.yahoo.net.

From a user's explicit current status information, the tracking server 1013 may infer his implicit current status information. For example, from a user's positioning signals, which are explicit location information, the tracking server 1013 may infer implicit location information such as how close the user is to a searched location and in which direction he is moving. From the explicit time information on a communication device, the tracking server 1013 may infer the user's implicit time information such as the time proximity related to the search query and how long he has stayed at one location. The implicit current status information may be stored in the database 1015, together with the user's explicit current status information.

The user's status information, both explicit and implicit, may be stored in the database 1015, as current status information at first and as historical status information later on. In one embodiment, the tracking server 1013 may also obtain a user's future status information and store it in the database 1015. The future status information may include, e.g., whether the user will go to a searched location or will participate in a searched activity. The tracking server 1013 may obtain the future status information from the user's calendar.

In one embodiment, the tracking server 1013 may also track a user's on-line activities and store in the database 1015 information about the on-line activities. On-line activities may include web pages the user browsed, time spent browsing, his on-line shopping records, on-line services he registered for, web content he downloaded, web content he uploaded (e.g., Flickr™ tags, geo-related tags, his instant messaging, his chats, search queries he input or responded to, and his information on-line (e.g., his calendar, his blog, his Twitter™ or Facebook™ communication status, etc.).

From the information of a user stored in the database 1015, which may include the user's historical, current and future status information, both explicit and implicit, and on-line activity information, the tracking server 1013 may infer his implicit profile information. For example, from a user's location information, the tracking server 1013 may find out whether he has been to a searched location before, his affinity to that location, and/or his traveling profile (e.g., whether a user visits Seattle, Houston, or Miami, and with what frequency). From a user's time information, the tracking server 1013 may infer his frequency profile (e.g., a user goes to his gym at least twice per week), his temporal profile, and/or his routine schedule (e.g., a user is at work from 9 am to 5 pm, Monday to Friday). From a user's activity information, the tracking server 1013 may infer implicit activity information such as his affinity to an activity. If the user had gone to a particular sushi restaurant or multiple sushi restaurants several times in the last month, the tracking server 1013 may infer that he is very familiar with that restaurant or with sushi restaurants generally, and may select that user as a responder to search queries about that restaurant or about any sushi restaurant. From a tag the user added, the tracking server 1013 may infer implicit profile information such as whether the user is familiar with a searched location, or has participated or will participate in a searched activity. If a user often publishes reviews about cameras, the tracking server 1013 may infer that he may be an expert at cameras and may be able to answer questions about cameras. If a user posted an article about Yellowstone National Park on his blog, the tracking server 1013 may infer that he may be very knowledgeable about that park and may be able to answer questions about it.

The registration server 1015 may receive from a user his explicit profile information. The explicit profile information may include, e.g., what he is an expert at, his hobbies, his favorite singers, sports he likes, and places he is familiar with. Specifically, time related profile information may include the user's schedule, his proclaimed temporal expertise, and the time period he is available to respond to search queries, e.g., between 5 pm and 10 pm from Sunday to Friday. Location related profile information may include his affinity to locations, his location preferences, his proclaimed location expertise and his location profile, such as his gym, and his favorite restaurants, shops and movie theaters. Activity related profile information may include his proclaimed expertise on activities, his activity profile, and his preferences for activities, e.g., what he likes doing, what he dislikes doing. The explicit profile information may also include the user's calendar, and his methods of communication, e.g., email, text messaging, instant messaging etc. A user's explicit profile and implicit profile may be consolidated into one user profile and stored in the database 1015.

The database 1015 may store information obtained by the tracking server 1013 and received by the registration server 1015, which may be used to determine whether a user is knowledgeable about a search query and can be selected as a responder.

A user prioritization server 1012 may evaluate query relevancy to users and forward a search query to the most relevant user(s), resulting in a match for queries and responders. It may be coupled to the query processing server 1011 to receive the processed search query, and to the database 1014 to access users' status information, on-line activity information and profile to ascertain users who are most relevant to the search query, select one or more of them as responder(s) to respond to the search query, and forward the search query to the selected responders. In one embodiment, the user prioritization server 1012 may receive users' current status information from the tracking server 1013, instead of the database 1014.

If a search query belongs to the activity category, the user prioritization server 1012 may search the database 1014 for users who participated in the searched activity, who are currently participating the searched activity or who will participate in the searched activity.

If a search query belongs to the location category, the user prioritization server 1012 may search the database 1014 for users who are currently at the location, close to the location, have frequently visited the location or have been to that location. The user prioritization server 1012 may also look at the frequency a user goes to that location and the amount of time the user has spent there. In one embodiment, the user prioritization server 1012 may rank the potential responders, giving users who are currently at that location the highest rank, users who are currently close to that location the second highest rank, and users who have been to that location before the third highest rank.

In one embodiment, the user prioritization server 1012 may also look at information about a user's network of friends with information from social websites, e.g., www-.facebook.com.

The user prioritization server 1012 may use various types of methods to calculate a user's relevancy to a search query. In one embodiment, the user prioritization server 1012 may calculate a user's relevancy to a search query with a query relevancy algorithm, using a user's historical, current and future status information, the user's on-line activities and the user's profile, both explicit and implicit, as variables in the algorithm.

In one embodiment, the user prioritization server 1012 may calculate a user's overall relevancy score to a search query, and formulate a query-relevancy-to-user ranking. In one example, depending on a particular search query, a user who lives within 5 minutes of a theater may score lower than a user who is currently at the theater. The prioritization server 1012 may include a user in a pool of potential responders if his score is above a certain threshold, and may filter out a user if his score is beneath the threshold.

In one embodiment, the user prioritization server 1012 may weigh in a responder's historical participation data, e.g. frequency of response, immediacy of response and relevancy of response, as part of the calculation of the overall relevancy score.

Figure 3A:
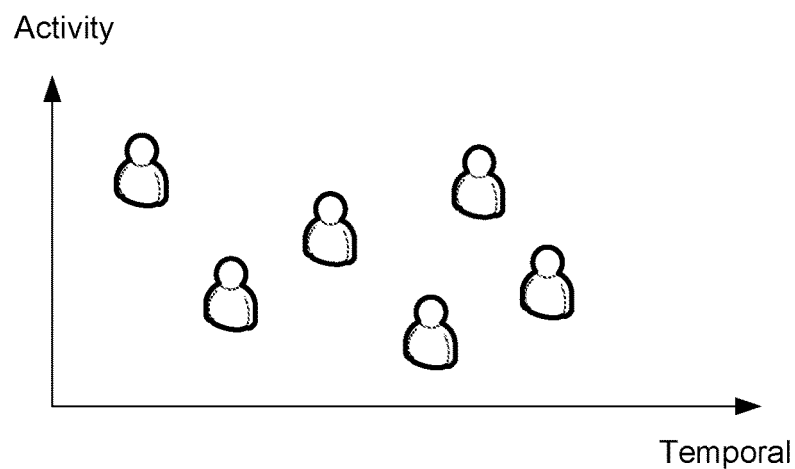
FIGS. 3A, 3B and 3C illustrate coordinate systems used to select users who are best suited to respond to a communal search query according to one embodiment of the present invention.

In one embodiment, the user prioritization server 1012 may use an X-Y or an X-Y-Z coordinate system to select users who are most relevant to a search query. FIG. 3A illustrates an X-Y coordinate system for selecting users who are most relevant to an activity at a specific time according to one embodiment of the present invention. As shown, the coordinate system may use temporal data as the X axis, and the activity data as the Y axis. The temporal data may be based on a day, a month, a season or a year. This coordinate system may be used, e.g., to find users who are most knowledgeable about ball games on a certain day.

Figure 3B:
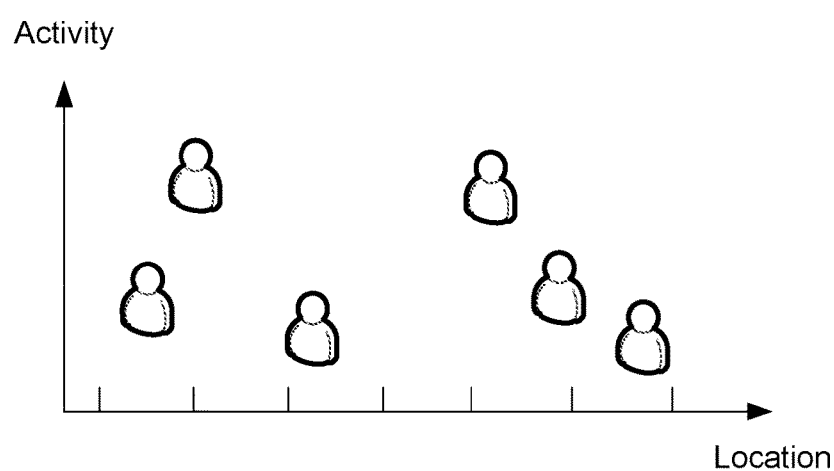

FIG. 3B illustrates an X-Y coordinate system for selecting users who are most relevant to an activity at a specific location according to one embodiment of the present invention, using the location data as the X axis and the activity data as the Y axis. The location data may be at various levels, e.g., building level, street level, city level, state level, country level or planet level. The coordinate system may be used to, e.g., select users who are knowledgeable about parties at a certain location.

Figure 3C:
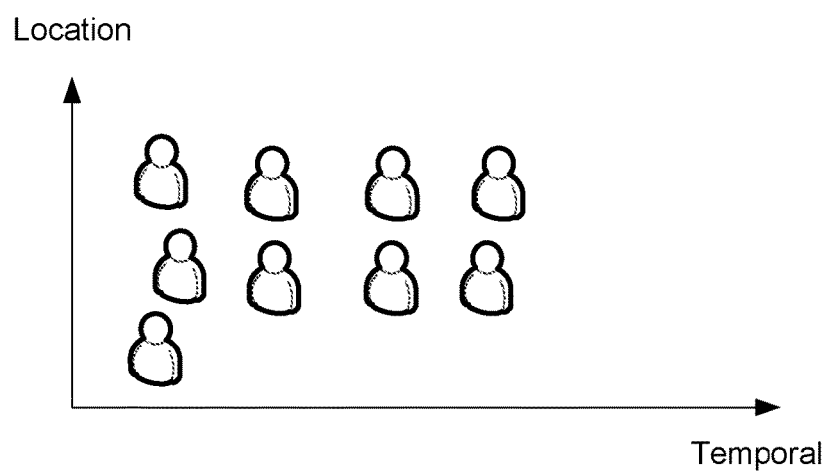

FIG. 3C illustrates an X-Y coordinate system for selecting users who are most relevant to a location at a specific time according to one embodiment of the present invention, using temporal information as the X axis and location information as the Y axis. The coordinate system may be used to look for, e.g., users who know whether a certain restaurant has available tables at 7 pm on April 8.

An X-Y-Z coordinate system may be used if three types of information need to be considered to select responders, e.g., is there any event (activity) at the HP Pavilion (location) on March 25 (time)?

In one embodiment, rather than using a coordinate system for an X-Y or an X-Y-Z plot, a Venn diagram type of approach may be used. For example, in a Venn diagram, a different circle may to used to represent each category of information, e.g., time, location or activity, and the overlap between the circles may represent the most relevant users. For example, if a search query is about a hockey game at the HP Pavilion on March 25, one circle may represent users who often watch hockey games, one circle may represent users who often go to the HP Pavilion, and one circle may represent users who had/or will have activities on March 25. The overlap among the three circles may identify users most relevant to the search query.

In one embodiment, the requester may rate the response and/or the responder using a ranking system. The rating may be leveraged by the system as a method to determine query and responder relevancy.

In one embodiment, the user prioritization server 1012 may gather ratings on responses or responders. The ratings may be used as a part of the overall relevancy score.

The user prioritization server 1012 may receive responses from the responders, and return the responses to the query processing server 1011, which may send the responses to the requester's communication device or display the responses on a webpage so that the requester may see the responses. The query processing server 1011 may also update the database 1014 to indicate what the search query is, who is the requester, who are the responders, and what the responses are.

Although a number of servers are shown in the communal search system 101 in FIG. 1, it should be understood that the described functions may be performed by modules in one server. Also, information in the database 1014 may be stored separately in several databases.

Figure 4:
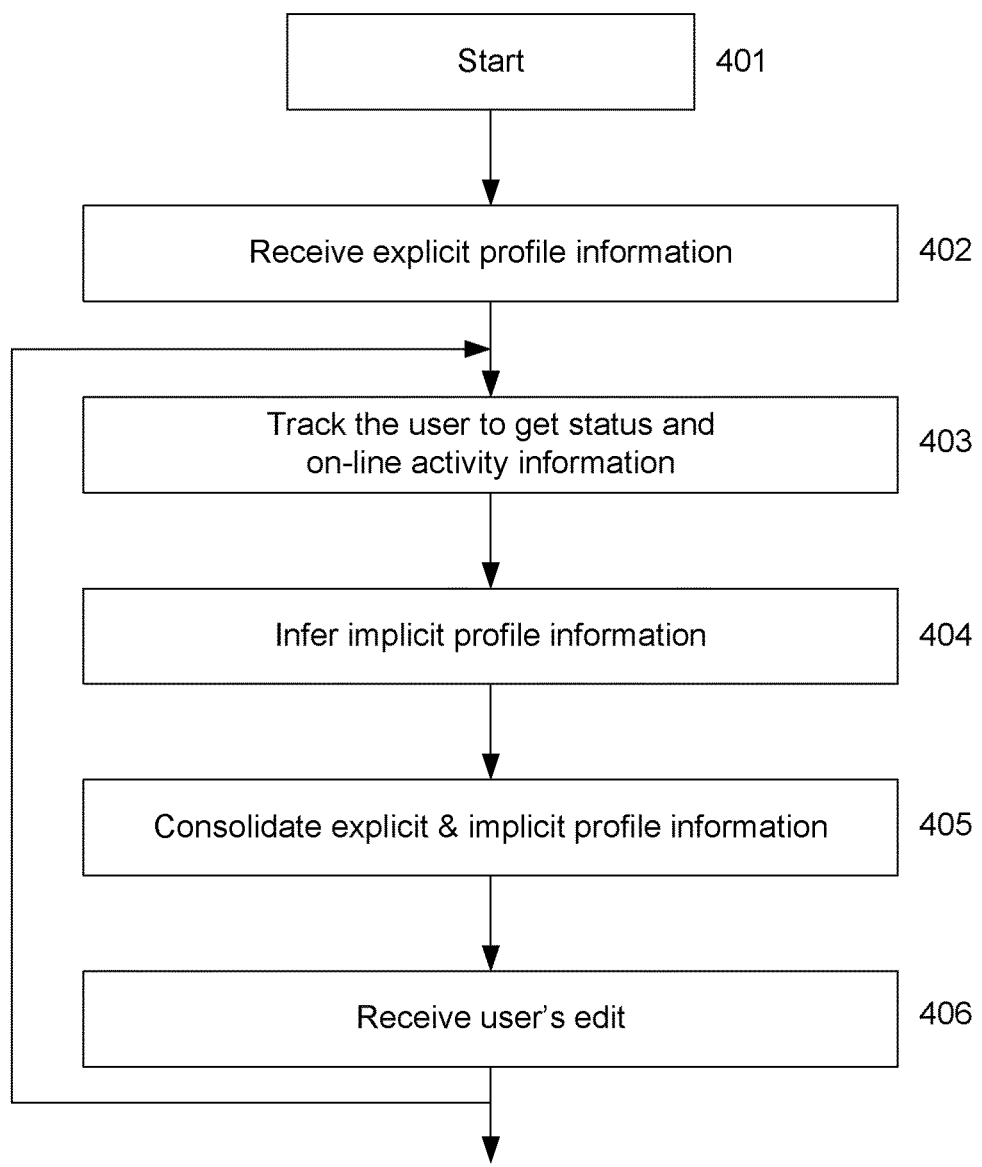
FIG. 4 illustrates a flowchart of a method for compiling a user profile according to one embodiment of the present invention.

FIG. 4 illustrates a flowchart of a method for compiling a user profile according to one embodiment of the present invention.

At 401, a user may start to sign up for the service of the system 101.

At 402, the registration server 1015 may receive explicit profile information from the user. The explicit profile information may include, e.g., what he is an expert at, his hobbies, his favorite singers, sports he likes, and places he is familiar with. Specifically, time related profile information may include the user's schedule, his proclaimed temporal expertise, and the time period he is available to respond to search queries, e.g., between 5 pm and 10 pm from Sunday to Friday. Location related profile information may include his affinity to locations, his location preferences, his proclaimed location expertise and his location profile, such as his gym, and his favorite restaurants, shops and movie theaters. Activity related profile information may include his proclaimed expertise on activities, his activity profile, and his preferences for activities, e.g., what he likes doing, and what he dislikes doing. The explicit profile information may also include the user's calendar, and his methods of communications, e.g., email, text messaging, instant messaging etc.

At 403, the tracking server 1013 may track the user to obtain his status information and on-line activities and store the obtained information in the database 1015. The status information may include the user's historical, current and future location and/or activity information and his on-line activities, both explicit and implicit. The on-line activities may include web pages the user browsed, time spent browsing, his on-line shopping records, on-line services he registered for, web content he downloaded, web content he uploaded (e.g., Flickr™ tags, geo-related tags, his instant messaging, his chats), search queries he input or responded to, and his information on-line (e.g., his calendar, his blog, his Twitter™ or Facebook™ communication status).

At 404, the tracking server 1013 may infer implicit profile information about the user from the information stored in the database 1014.

At 405, the tracking server 1013 may consolidate the explicit profile and implicit profile information and generate a profile for the user.

At 406, the user may review and edit the profile. The user may delete or ignore some implicit profile information added to his profile by the tracking server 1013.

In one embodiment, a group of users may compile a collective group profile, and each group member may review and edit the profile.

403-406 may repeat to keep the user's profile up to date. The user's profile may be used with the method shown in FIG. 5.

Figure 5:
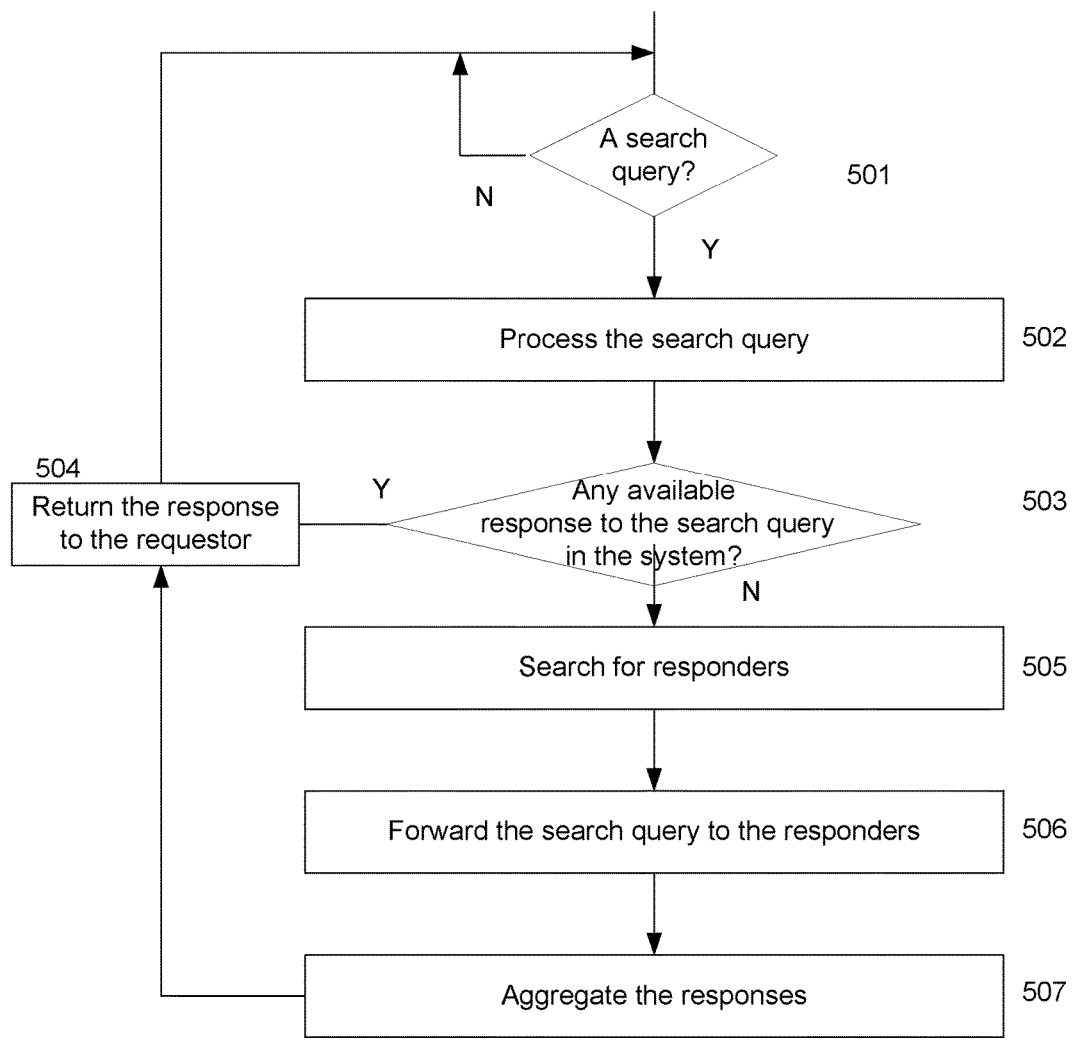
FIG. 5 illustrates a flowchart of a communal search method according to one embodiment of the present invention.

FIG. 5 illustrates a flowchart of a communal search method according to one embodiment of the present invention. The method may be used in the system shown in FIG. 1.

At 501, a requester may send a search query to the system 101. The search may be: Is it easy to find parking close to the Mountain View Public Library now? The requester may use the user interface shown in FIG. 2A, typing "parking" in the text box for Query Title, "parking close to Mountain View Public Library" in the text box for Query Description and "4 pm" and "4:30 pm" in the text boxes for Start Time and End Time respectively, and directing his search query to the system's users.

At 502, the query processing server 1011 may process the search query into query categories recognized by the system, e.g., location. If the requester uses the user interface shown in FIG. 2B, 502 may be skipped.

In one embodiment, the query processing server 1011 may determine content relevant to the query. For example, when the requester does not input the Start Time and End time, the query processing server 1011 may use the system clock as the current time. The query processing server 1011 may also automatically derive the Mountain View Public Library address and add the information as part of the requester's query conditions.

At 503, the query processing server 1011 may search the database 1014 for responses to the search query. If a similar search query has been processed before and the response is stored in the database 1014, the query processing server 1011 may return the response to the requester at 504. Alternatively, the response may be displayed on a web page.

If there is not any response to the search query in the database 1014, at 505, the query processing server 1011 may send the search query to the user prioritization server 1012, which may select users who are best suited to respond to the search query. The user prioritization server 1012 may search the database 1014 for users who are knowledgeable about the library as responders, considering their current, historical and future status information, on-line activity information and/or profiles. For users who provided explicit profile information, both his explicit and implicit profile may be searched. For users who did not provide explicit profile information, only his implicit profile may be searched. The user prioritization server 1012 may select the most relevant users as responders.

In one embodiment, from explicit status and profile information, the user prioritization server 1012 may find out users who are currently at the library, who include the library in their preferred locations, who claim to be experts about the library, or who live close to the library. From implicit status and profile information, the user prioritization server 1012 may find out users who are close to the library, who go to the library frequently, who tagged about the library, or who discussed the library in a chat. The user prioritization server 1012 may also look at users' schedule and consider whether a user is available to answer questions now.

At 506, the user prioritization server 1012 may forward the search query to the selected responders. A number of selected responders may respond to the search query, and their responses may be "Yes," "Quite easy," or "There is public parking nearby." The responders may choose to remain anonymous or to reveal their identities to the requester.

At 507, the query processing server 1011 may receive the responses from the responders directly or via the user prioritization server 1012. The query processing server 1011 may aggregate the responses, categorize the aggregated responses as system-recognizable categories, and store the categorized and aggregated responses in the database 1014 for future responses.

The process may proceed to 504 to either return the responses to the requester or display the responses on a web page.

The process may then return to 501 to wait for search queries.

The requester may send additional search queries to the system 101, e.g., "where is the public parking?" and 502 to 507 may repeat. Alternatively, the user prioritization server 1012 may forward the additional search query directly to the responder whose response is "There is public parking nearby," since he may be the most knowledgeable user about the public parking.

Consequently, the requester may receive responses to his question in a timely fashion, from users who are best suited to answer the question.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A communal search method comprising:
receiving, at a computing device, a search query posted by a requester, said search query comprising a question that asks for information related to an activity at a location;
searching, via the computing device based on the received search query, a database of relevancy information associated with a plurality of users, said database comprising a prioritized set of information for each user indicating a type of information each user is knowledgeable about, said database further comprising real-time tracked information for each user indicating a positional and network status of each user, said searching comprising analyzing said information based on said question in the search query;
identifying, via the computing device, based on said search and analysis, at least one responder currently online with a level of knowledge about the activity and associated with a position related to said location from said plurality of users;
automatically sending, via the computing device, the question specified in the posted search query to the identified at least one responder upon identifying the at least one responder;

receiving, at the computing device, a response providing the information asked for by the requester from the at least one responder; and presenting, via the computing device, the response.

2. The method of claim 1, further comprising: determining whether the search query falls into a category selected from the group consisting of location and activity.

3. The method of claim 1, further comprising: when there are more than one responder, ranking the responders.

4. The method of claim 1, further comprising: determining whether there is a previously stored response to the question specified in the posted search query.

5. The method of claim 1, further comprising: storing the response.

6. The method of claim 1, further comprising: calculating a user's relevancy to the search query.

7. The method of claim 1, wherein the relevancy information comprises status information selected from the group consisting of time, location and activity.

8. The method of claim 7, wherein the relevancy information comprises an implicit user profile inferred from the status information.

9. The method of claim 7, wherein the status information comprises real time status information.

10. The method of claim 7, wherein the status information comprises historical status information.

11. The method of claim 1, wherein the relevancy information comprises on-line activity information.

12. The method of claim 1, wherein the relevancy information comprises explicit user profile information received from a user.

13. The method of claim 8, further comprising: consolidating the implicit user profile with an explicit user profile received from a user.

14. The method of claim 1, further comprising: tracking a user to obtain the user's relevancy information.

15. The method of claim 1, wherein the relevancy information is a user's activity information inferred from the user's social context.

16. The method of claim 14, further comprising: storing the relevancy information in a database.

17. The method of claim 6, further comprising: considering a user's historical participation data when calculating the user's relevancy.

18. The method of claim 6, further comprising: receiving ratings on a responder and considering the ratings when calculating the user's relevancy.

19. The method of claim 1, further comprising: compiling a collective group profile for a group of users, and each user in the group may edit the profile.

20. A non-transitory computer-readable storage medium tangibly encoded with computer-executable instructions that, when executed by a computer, perform a communal search method, comprising:

receiving a search query posted by a requester, said search query comprising a question that asks for information;

searching, based on the received search query, a database of relevancy information associated with plurality of users, said database comprising a prioritized set of information for each user indicating a type of information each user is knowledgeable about, said database further comprising real-time tracked information for each user indicating a positional and network status of each user, said searching comprising analyzing said information based on said question in the search query;

identifying, via the computing device, based on said search and analysis, at least one responder currently online with a level of knowledge about the activity and associated with a position related to said location from said plurality of users;

automatically sending the question specified in the posted search query to the identified at least one responder upon identifying the at least one responder;

receiving a response providing the information asked for by the requester from the at least one responder; and presenting the response.

21. A computing device comprising:

a processor;

a non-transitory computer-readable storage medium for tangibly storing thereon program logic for execution by the processor, the program logic comprising:

logic executed by the processor for receiving, at the computing device, a search query posted by a requester, said search query comprising a question that asks for information;

logic executed by the processor for searching, via the computing device based on the received search query, a database of relevancy information associated with a plurality of users, said database comprising a prioritized set of information for each user indicating a type of information each user is knowledgeable about, said database further comprising real-time tracked information for each user indicating a positional and network status of each user, said searching comprising analyzing said information based on said question in the search query;

logic executed by the processor for identifying, via the computing device, based on said search and analysis, at least one responder currently online with a level of knowledge about the activity and associated with a position related to said location from said plurality of users;

logic executed by the processor for automatically sending, via the computing device, the question specified in the posted search query to the identified at least one responder upon identifying the at least one responder;

logic executed by the processor for receiving, at the computing device, a response providing the information asked for by the requester from the at least one responder; and logic executed by the processor for presenting, via the computing device, the response.

* * * * *